(12) United States Patent
Mihály et al.

(10) Patent No.: US 9,479,445 B2
(45) Date of Patent: Oct. 25, 2016

(54) APPLICATION-AWARE FLOW CONTROL IN A RADIO NETWORK

(75) Inventors: Attila Mihály, Dunakeszi (HU); Lars Westberg, Enköping (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 88 days.

(21) Appl. No.: 14/363,164

(22) PCT Filed: Dec. 9, 2011

(86) PCT No.: PCT/SE2011/051493
§ 371 (c)(1),
(2), (4) Date: Jun. 5, 2014

(87) PCT Pub. No.: WO2013/085443
PCT Pub. Date: Jun. 13, 2013

(65) Prior Publication Data
US 2014/0334309 A1    Nov. 13, 2014

(51) Int. Cl.
*H04L 12/26*    (2006.01)
*H04W 28/02*    (2009.01)
(Continued)

(52) U.S. Cl.
CPC ....... *H04L 47/2475* (2013.01); *H04L 47/2441* (2013.01); *H04W 28/0205* (2013.01); *H04W 28/0268* (2013.01); *H04W 72/12* (2013.01)

(58) Field of Classification Search
CPC .................. H04L 45/38; H04L 47/10; H04L 47/18–47/20; H04W 28/10; H04W 28/16; H04W 28/18
See application file for complete search history.

(56) References Cited

U.S. PATENT DOCUMENTS 7,269,157 B2 * 9/2007 Klinker ............... H04L 12/5695
370/228
7,496,661 B1 * 2/2009 Morford ............. H04L 41/5025
709/224

(Continued)

FOREIGN PATENT DOCUMENTS

WO    2010088490 A1    8/2010

OTHER PUBLICATIONS

Hall, Edward, "Draft LS on Radio Metrics with Respect to QoE", TSG-SA4#65 meeting, TDoc S4-110800, Kista, Sweden, Aug. 15-19, 2011, 1 page.

(Continued)

*Primary Examiner* — Alpus H Hsu
(74) *Attorney, Agent, or Firm* — Patents on Demand, P.A.; Brian K. Buchheit; Scott M. Garrett

(57) ABSTRACT

The disclosure relates to a method and network node for controlling a plurality of flows of application data in a radio network. The plurality of flows and a cost measure associated with each flow is detected. The cost measure is an indication of an amount of radio resources required for supplying an amount of application data to an end-user of the flow. Further, key performance indicators associated with the plurality of flows are monitored. A key performance indicator is indicative of a supply of application data needed to maintain a satisfactory quality of experience for an application session associated with the flow. Further, scheduling decisions, to control scheduling of the plurality of flows, are made based on the cost measures and key performance indicators associated with the plurality of flows to optimize the quality of experience of the application sessions associated with the plurality of flows.

24 Claims, 4 Drawing Sheets

(51) Int. Cl.
*G06F 15/16* (2006.01)
*H04L 12/859* (2013.01)
*H04L 12/851* (2013.01)
*H04W 72/12* (2009.01)

(56) References Cited

U.S. PATENT DOCUMENTS

| | | | | |
|---|---|---|---|---|
| 7,639,630 | B2* | 12/2009 | Healy | H04L 41/5067 370/252 |
| 7,796,514 | B2* | 9/2010 | Noriega | H04L 47/10 370/230 |
| 7,796,524 | B1* | 9/2010 | O'Connell | H04L 12/2602 370/235 |
| 7,797,406 | B2* | 9/2010 | Patel | H04L 41/5022 709/220 |
| 7,843,843 | B1* | 11/2010 | Papp, III | H04L 12/26 370/252 |
| 7,929,459 | B2* | 4/2011 | Silva | H04W 16/22 370/255 |
| 7,929,512 | B2* | 4/2011 | Malomsoky | H04W 24/08 370/345 |
| 8,223,656 | B2* | 7/2012 | Rius i Riu | H04L 12/2856 370/241 |
| 8,285,298 | B2* | 10/2012 | Noriega | H04W 72/1236 370/329 |
| 8,320,261 | B2* | 11/2012 | Vasamsetti | H04L 41/12 370/242 |
| 8,488,460 | B2* | 7/2013 | Holm-Oste | H04L 41/507 370/232 |
| 8,665,733 | B2* | 3/2014 | Eskicioglu | H04L 12/6418 370/241 |
| 9,007,919 | B2* | 4/2015 | Ivanyi | H04L 43/08 370/241 |
| 2002/0114274 | A1* | 8/2002 | Sturges | H04L 12/5695 370/229 |
| 2002/0198995 | A1* | 12/2002 | Liu | H04L 29/06 709/226 |
| 2004/0044740 | A1* | 3/2004 | Cudd | G06F 17/30902 709/217 |
| 2005/0002453 | A1* | 1/2005 | Chang | H04N 21/2402 375/240.03 |
| 2006/0159017 | A1* | 7/2006 | Mun | H04L 12/2602 370/230 |
| 2007/0041326 | A1* | 2/2007 | Babiarz | H04L 41/5022 370/237 |
| 2007/0147320 | A1* | 6/2007 | Sattari | H04L 12/5695 370/338 |
| 2008/0046266 | A1* | 2/2008 | Gudipalley | G06Q 10/00 370/230 |
| 2011/0141893 | A1* | 6/2011 | Song | H04L 41/5022 370/235 |
| 2012/0072267 | A1* | 3/2012 | Gutierrez, Jr. | G06Q 10/063 705/7.39 |
| 2013/0124712 | A1* | 5/2013 | Parker | H04L 41/5038 709/224 |
| 2014/0126502 | A1 | 5/2014 | Westberg et al. | |
| 2014/0337871 | A1* | 11/2014 | Garcia De Blas | H04N 21/64738 725/14 |

OTHER PUBLICATIONS

Holm-Öste, Gerd et al., "Ericsson's User Service Performance Framework", Ericsson Review No. 1, pp. 1-4, 2008. Available online at: http://www.ericsson.com/ericsson/corpinfo/publications/review/2008_01/files/7_EricssonsUserService.pdf.

Piamrat, Kandaraj et al., "QoE-Aware Scheduling for Video-Streaming in High Speed Downlink Packet Access", 2010 IEEE Wireless Communications and Networking Conference (WCNC), Sydney, Australia, Apr. 18-21, 2010, pp. 1-6.

Unknown, Author, "3GPP TS 23.401, V9.1.0", 3rd Generation Partnership Project; Technical Specification Group Services and System Aspects; General Packet Radio Service (GPRS) enhancements for Evolved Universal Terrestrial Radio Access Network (E-UTRAN) access (Release 9), Jun. 2009, pp. 1-234.

* cited by examiner

APPLICATION-AWARE FLOW CONTROL IN A RADIO NETWORK

TECHNICAL FIELD

The embodiments described herein relate to controlling flows of application data and in particular to controlling flows of application data in a radio network.

BACKGROUND

There is a continued and increasing interest of delivery of Over-the-top (OTT) services in cellular networks. Such OTT services may e.g. be video, television or other services provided over the Internet. Today these services are delivered as normal best effort (BE) traffic. However, in some cases the OTT applications would require specific treatment in order to get a satisfactory experience at the receiver side, often referred to as quality of experience (QoE). This is the case e.g., for Internet video traffic, which is getting more and more prevalent in mobile broadband traffic.

Video applications are sometimes controlled either from client or server side in order to cope with the fluctuating bandwidth of the Internet. Based on experienced throughput, the video quality, and consequently the required bandwidth, is changed. In this way a seamless play-out may be guaranteed as long as there is content in a play-out buffer of a video player to serve. In case of buffer underrun, i.e. the play-out buffer runs empty, the picture freezes and the play-out waits until the size of the buffered video data in the play-out buffer again reaches a pre-configured threshold for continued play-out. A rotating symbol on the screen may show the end-user that the video player is waiting for new data.

New deployments of chunk-based streaming video applications may infer a large problem when resources for application data delivery are not sufficient. When a chunk of application data has been downloaded the video may start to play but it may stop before the next chunk has arrived in the play-out buffer. This means that the play-out may experience frequent and repetitive frozen image events during a session, which can lead to a very low quality of experience as perceived by the end-user.

The term "quality of experience" (QoE) will be used herein to refer to quality of an application session which may be perceived by an end-user and influences a user's experience of the application session. In case of a video application session, a measure of the QoE may include such parameters as number of frozen image events during a session, duration of frozen image events and latency, i.e. time from initiation of the video application service until the play-out of the video starts. The QoE is related to but differs from the quality of service (QoS). As used herein the term "quality of service" relates to the quality of a bearer set-up in a communication network. Again using the example of the video application session, the end-user may not notice any difference in the play-out of the video if the QoS changes as long as the QoS is sufficient to keep the play-out buffer from underrun. However, poor QoS may lead to events of play-out buffer underrun which impacts the QoE. Hence QoE relates to quality on an application level, while QoS relates to quality on a bearer level.

Delivery of content related to e.g. OTT services is qualitatively different in case of a mobile access compared to cases with fixed access. In case of e.g. Internet video streaming a larger number of video freeze/rebuffering events can be expected with mobile access than with fixed access, especially if the content is served in interactive radio bearers, together with other BE traffic. The reason is that there is a bottleneck on the 'first mile', namely in the form of limited bandwidth resources over the radio interface. This means that the statistical traffic fluctuations on the bottleneck link, i.e. over the radio interface, are large. In addition, the available capacity per mobile terminal also depends on the channel quality experienced. Thus the capacity that is available for a subscriber is rather unpredictable and depends on the subscriber's position, velocity and other subscribers' position and activity as well.

One straightforward solution for controlling delivery of application data to or from a mobile terminal would be to apply a standard QoS architecture in line with the $3^{rd}$ Generation Partnership Program (3GPP) standard to guarantee a required long-term throughput for all packet data applications by setting up guaranteed bit-rate (GBR) bearers towards the mobile terminal. A description of such a solution can be found in the standard document 3GPP TS 23.401 V9.1.0 (2009-06), General Packet Radio Service enhancements for Evolved Universal Terrestrial Radio Access Network (E-UTRAN) access (Release 9). It can be understood that there are potential scalability problems of bearer setup signaling with this solution. Furthermore, it is obvious that this solution would result in a relatively low number of serviced OTT requests due to the limited number of high-priority, e.g., GBR bearers that may be allowed in the system. Accordingly there is a problem of radio spectrum efficiency associated with this solution.

Another method for controlling delivery of application data in case of a mobile access has been proposed in the international patent application with publication No. WO 2010/088490 A1 and is based on traffic throttling. According to this method, media content is segmented into smaller parts (e.g., corresponding to a 2-minute presentation in case of a video service) and each segment is scheduled based on the estimated presentation time, i.e., the time when the given part is needed in the application session. The goal is that the delivery time for the segment should be less, but not much less, than the presentation time. By delaying some of the segments of a bearer with good radio conditions the content from the other bearers get higher chance to be delivered in time. However, throttling of traffic is generally not spectrum-efficient since it may leave some radio capacity unused even if there would be traffic to send. In the case of packet data applications, for example, such periods could be used to pre-fill play-out buffers that could pay off at a later time of potential congestion.

SUMMARY

It is an object to provide a method and apparatus that allow for controlling flows of application data in a radio network in a radio spectrum efficient way.

The above stated object is achieved by means of a method and a network node according to the independent claims.

A first embodiment provides a method for use in a network node for controlling a plurality of flows of application data in a radio network. The method comprises a step of detecting the plurality of flows and a cost measure associated with each flow. The cost measure is an indication of an amount of radio resources required for supplying an amount of application data to an end-user of the flow. The method also comprises a step of monitoring key performance indicators associated with the plurality of flows. A key performance indicator of a flow is indicative of a supply of application data needed to maintain a satisfactory quality of experience for an application session associated with the flow. The method further comprises a step of making scheduling decisions based on the cost measures and key performance indicators associated with the plurality of flows, to control radio scheduling of the plurality of flows in order to optimize an optimization criterion for optimizing quality of experience of the application sessions associated with the plurality of flows.

A second embodiment provides a network node for controlling a plurality of flows of application data in a radio network. The network node comprises processing circuitry configured to detect the plurality of flows and a cost measure associated with each flow. The cost measure is an indication of an amount of radio resources required for supplying an amount of application data to an end-user of the flow. The processing circuitry is also configured to monitor key performance indicators associated with the plurality of flows. A key performance indicator of a flow is indicative of a supply of application data needed to maintain a satisfactory quality of experience for an application session associated with the flow. The processing circuitry is further configured to make scheduling decisions based on the cost measures and key performance indicators associated with the plurality of flows, to control radio scheduling of the plurality of flows in order to optimize an optimization criterion for optimizing quality of experience of the application sessions associated with the plurality of flows.

An advantage of some of the embodiments of this disclosure is that increased radio spectrum efficiency can be achieved. By considering QoE associated with a plurality of flows of application data when making scheduling decisions, the available radio resources may be used wisely to provide as good QoE as possible. It is made possible to avoid situations with a large number of application sessions with insufficient QoE to a higher extent than with prior art QoS control mechanisms.

Another advantage of some of the embodiments of this disclosure is that QoE for mobile users may be increased. It may e.g. be possible for a higher number of video viewers to avoid buffer under-run during playout.

Another advantage of some of the embodiments of this disclosure is that no terminal support is required. In particular, QoS bearer support from the terminals is not required. Thus, there are embodiments of this disclosure which may work with current Long Term Evolution (LTE) dongles. There is also no requirement to use the dynamic QoS mechanisms in the mobile network, which off-loads the control plane.

Further advantages and features of embodiments of the present invention will become apparent when reading the following detailed description in conjunction with the drawings.

DETAILED DESCRIPTION

Figure 1:
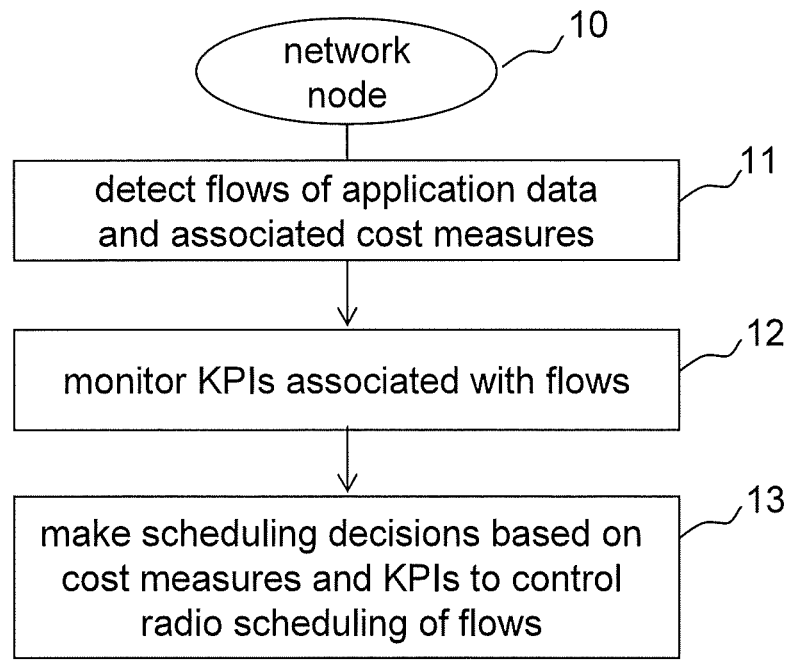
FIG. 1 is a flow diagram illustrating an embodiment of method for controlling a plurality of flows of application data in a radio network.
Figure 4:
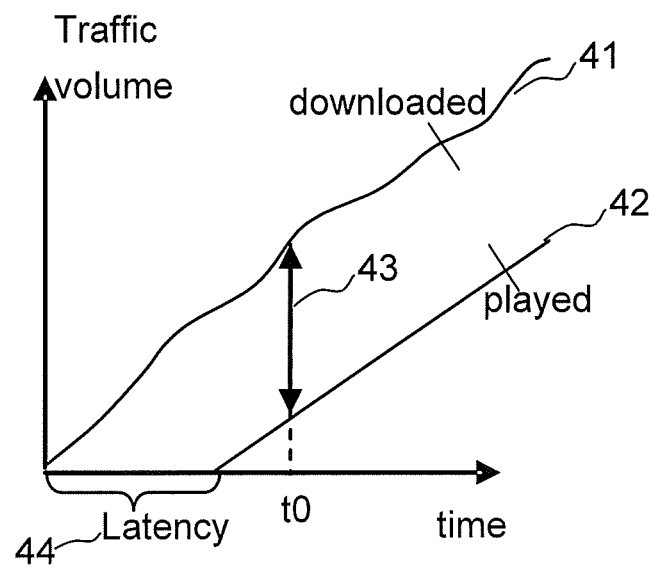
FIG. 4 is schematic diagram illustrating how a buffer fill level of a play-out buffer may be estimated.

The embodiments of this disclosure will now be described more fully hereinafter with reference to the accompanying drawings, in which different example embodiments are shown. These example embodiments are provided so that this disclosure will be thorough and complete and not for purposes of limitation. In the drawings, like reference signs refer to like elements.

FIG. 1 is a flow diagram illustrating an example embodiment of a method for use in a network node 10 for controlling a plurality of flows of application data in a radio network. The method allows for QoE control of the plurality of flows. In a step 11, the plurality of flows is detected as well as a cost measure associated with each flow. The cost measure is an indication of an amount of radio resources required for supplying an amount of application data to an end-user of the flow. The cost measure may e.g. be based on channel quality indicators (CQIs) determined for radio channels associated with the plurality of flows. If the CQI indicates poor radio channel quality a higher transmission power is required than if the radio channel quality is good. Thus a high CQI indicates a lower cost in terms of required radio resources, while a low CQI indicates a higher cost in terms of required radio resources. The method further comprises a step 12 of monitoring key performance indicators (KPIs) associated with the plurality of flows. A KPI of a flow is indicative of a supply of application data needed to maintain a satisfactory quality of experience for an application session associated with the flow. The KPIs which are relevant to monitor will depend on the type of application session with which a flow is associated. In case of a video session, a buffer fill level of a playout buffer may e.g. be estimated. The buffer fill level is indicative of the QoE-experience of the application session receiving the flow. In particular, potential QoE-degradation events (e.g., low video buffer), likely happened QoE degradations (e.g., frozen video image), and QoE experience well above the QoE degradation limit (e.g., high video buffer) may be monitored. Based on the cost measure and the KPIs associated with the flows, it is possible to derive a relative "cost" in terms of required radio resources for providing sufficient or satisfactory QoE for the application sessions associated with the flows. Information regarding the characteristics of the application associated with a flow would generally be known e.g. from information acquired during set-up of the application session. In case of a video player application it may e.g. be known how much application data the video player application requires in its playout buffer before playout starts and for a web browser application, a throughput required for quick download of web-pages may be known from information about the web browser type.

The method illustrated in FIG. 1 comprises a further step 13 of making scheduling decisions based on the cost measures and key performance indicators associated with the plurality of flows. The scheduling decisions are made to control radio scheduling of the plurality of flows in order to optimize an optimization criterion for optimizing QoE of the application sessions associated with the plurality of flows.

Typically it is of interest to maintain a satisfactory QoE for as many of the application sessions associated with the plurality of flows as possible. But there may be predefined conditions to this optimization which also needs to be considered, such as fairness conditions as will be explained in further detail below. Thus the QoE that is considered to be "optimal" may vary in different scenarios. However, it would generally be preferred that an application session experiences a few events of QoE degradation with somewhat longer duration than, many short events of QoE degradation with shorter duration. The preferred behaviour may be achieved by temporarily prioritizing certain flows while down-prioritizing other flows in the scheduling of radio resources.

There are different methods and mechanisms that may be used as tools to try to achieve optimal QoE of the application sessions associated with the plurality of flows as will be explained in connection with described example embodiments. According to some example embodiments the radio scheduling of the flows is controlled in accordance with their associated QoE status.

Figure 2:
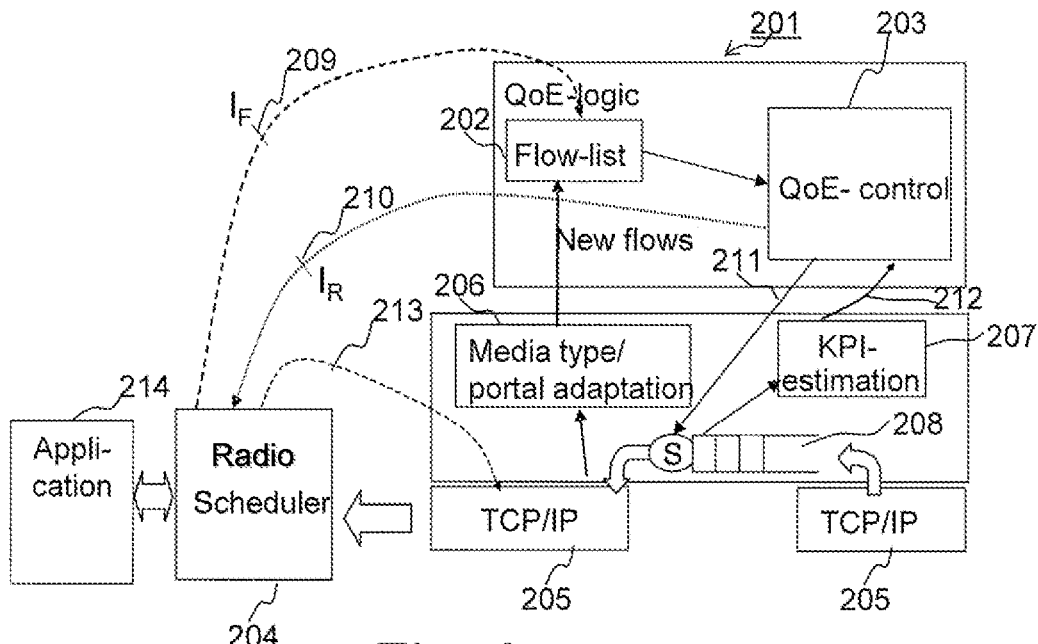
FIG. 2 is a schematic block diagram illustrating an embodiment of a functional architecture for implementation of a QoE-control algorithm.

An example embodiment of an architecture in which the method illustrated in FIG. 1 may be realized is shown in FIG. 2. The architecture comprises a QoE logic 201 which may be implemented in processing circuitry of a network node such as e.g. a radio network controller (RNC) or a base station, such as a radio base station (RBS), a NodeB or an e-NodeB. FIG. 2 describes a proxy implementation of the architecture. A plurality of Transmission Control Protocol/Internet Protocol (TCP/IP) flows are schematically illustrated and denoted with reference numeral 205. A TCP/IP-layer converts the IP-layer payload to HTTP-payload. Thereby KPI actions on HTTP-layers can be detected. The flows 205 correspond to a plurality of flows of application data to be delivered to applications 214 associated with the respective flows. In FIG. 2 a single application 214 is illustrated for simplicity. An application 214 may be associated with one or several flows 205.

The QoE logic 201 comprises a flow list 202. The flow list contains a list of detected ongoing flows and cost measures associated with the flows. The cost measures indicate of an amount of radio resources required for supplying an amount of application data to an end-user of the flows, respectively. The flow list may e.g. be a sorted list, wherein the on-going flows are sorted according to their relative "cost" with respect to radio resources. The cost measures may be based on CQI values reported for radio channels associated with the flows. Such CQI values may be received and updated regularly from a radio scheduler 204, in this example a Radio Link Control/Media Access Control (RLC/MAC) scheduler, together with cell identities of the cells in which terminals associated with the flows in the flow list currently reside in. The flow list 202 sends a notification to a QoE control module 203 implementing a QoE control algorithm every time the flow list 202 is informed about new flows or change of parameters of the ongoing flows. The flow list 202 may also store parameters related to the QoE-control algorithm, e.g., flow status or currently applied scheduling priority, as will be explained in further detail below. In FIG. 1 it is illustrated that the flow list receives feedback information ($I_F$) from radio scheduling. This feedback information includes information of the cost measure of the flows or information which may be used to derive cost measures for the flows. The feedback information may also include cell information such as radio resource utilization of the relevant cell(s). In some embodiments the QoE algorithm may use the information on the radio resource utilization as an input parameter when making scheduling decisions with respect to the flows. In case of a high cell load it may e.g. be appropriate to down-prioritize more flows in the radio scheduling than when the cell load is low.

A media type/portal adaptation module 206 is a functional module that generates triggers when new flows of application data (also referred to as media flows) appear. The module 206 selects the flows from the group 205 of TCP-flows going to a certain portal. The module 206 may merge chunks of data into the same flow if the chunks are requested in different TCP sessions. The module 206 may also manage specific video streaming sessions like Real Time Messaging Protocol (RTMP) streaming, if the content is stored locally. Finally, the module 206 may also retrieve media-parameters from flows, e.g. bit-rate.

The main purpose of a KPI-estimation module 207, illustrated in FIG. 2, is to estimate KPIs that describe the end-user perceived quality QoE by notifying the QoE-control module 203 of issues related to ongoing flows that may have problems to fulfill the QoE. By detecting so-called KPI events, changes in the QoE-control algorithm may be triggered. Examples of KPIs and KPI events and how they can be estimated will be described in more detail below.

FIG. 2 further illustrates a so-called pre-scheduler (S) 208. The role of the pre-scheduler is two-fold. On one hand the pre-scheduler may act as a parameter retriever for the different flows to retrieve parameters such as video type, size, video bit-rate, etc. On the other hand, the pre-scheduler performs per-flow scheduling. This is used in a case when multiple application sessions from the clients are used and some of them need to be shaped in order not to pre-empt those application sessions with stricter QoS-requirements. Accordingly shaping of flows in the pre-scheduler 208 is one way to indirectly control radio scheduling of the flows. Another way to control radio scheduling of the flows more directly is to change weights used by the Radio scheduler 204 in the air-interface. As indicated by an arrow 213 in FIG. 2, there may optionally also be radio network feedback from the RLC/MAC layer to the TCP layer such that the TCP layer can adapt quickly to changing radio conditions.

The QoE-control module 203 aims at optimizing the QoE of the application sessions associated with the flows in the flow list 202. According to example embodiments the QoE-control module 203 will implement a QoE control algorithm that e.g. tries to maximize the number of application sessions for which a satisfactory QoE is maintained or tries to maximize the number of flows that will provide sufficient QoE for the end-users. For this, the QoE-control module 203 interfaces with the KPI-estimation module 207 to get information 212 regarding the KPIs of the ongoing flows. The QoE-control module also controls the radio scheduler 204 and the pre-scheduler 208 to dynamically adapt the scheduling based on the received KPI-values. Scheduling decisions ($I_R$) used to control the radio scheduler are schematically illustrated with an arrow 210 and scheduling decisions used to control shaping of flows by the pre-scheduler 208 are schematically illustrated by and arrow 211 in FIG. 2. The scheduling decisions 210, 211 are determined by means of the QoE-control algorithm. Examples of QoE-control algorithms are detailed below.

Figure 3:
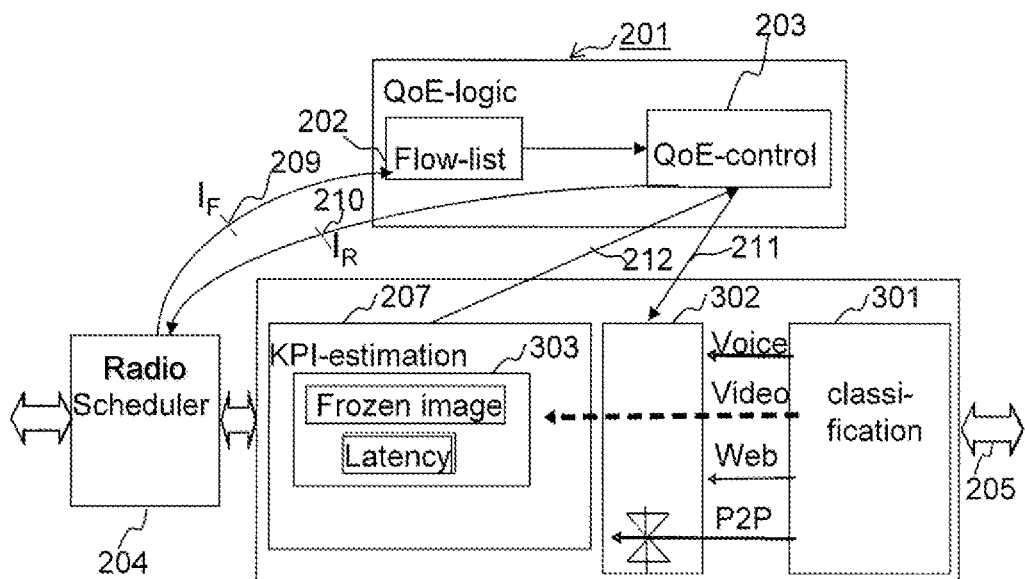
FIG. 3 is a schematic block diagram illustrating an alternative embodiment of a functional architecture for implementation of a QoE control algorithm.

Another example embodiment of an architecture in which the method illustrated in FIG. 1 may be realized is shown in FIG. 3. The architecture illustrated in FIG. 3 is based on deep packet inspection (DPI). Only those parts illustrated in FIG. 3 which differ from the architecture explained in connection with FIG. 2 will be explained in detail. The flows 205 of application data are, based on DPI classified according to application type by a classification module 301. A traffic shaper 302 has the same role as the pre-scheduler 208 illustrated in FIG. 2. The traffic shaper 302 may e.g. be controlled to shape the flows 205 according to their type. The KPI-estimation module 207 informs the QoE-control module of KPIs in the same way as in the embodiment illustrated in FIG. 2. As an example it is illustrated in FIG. 3 that the KPI-estimation module comprises a module 303 for estimation of KPIs, such as frozen image events and latency, related to video flows. There may be other modules provided for estimation of KPIs that are relevant to other types of flows. The functions corresponding to the media type/portal adaptation module 206 of FIG. 2 are embedded in the DPI-algorithms applied in the architecture of FIG. 3. The DPI-algorithms are assumed to be updated frequently and can adapt to different media formats and types.

FIG. 3 is a schematic diagram illustrating how some example flow-related KPIs may be estimated. The relevant KPIs depend on type of application and many options exist. FIG. 3 illustrates some KPIs which are relevant for video flows. A curve 41 illustrates downloaded traffic volume over time, while a curve 42 illustrates played volume over time. A buffer fill level 43 at a particular time t0 can be estimated by monitoring the downloaded traffic volume and comparing it to the played/viewed volume. The traffic volumes may be estimated by using TCP sequence numbers. The latter requires a knowledge of coding rates that may be observed by the media type/portal adaptation module 206 or e.g. by means of DPI. Latency 44 is the perceived response time for the end-user, i.e. the difference between the start-time of the download until the player starts to play-out the video on the screen. The latency may also be estimated from the downloaded volume given that the pre-buffer size (the amount of video data that is buffered before playout starts) of the player is known.

The KPI-estimation module may be configured to report KPI-events to activate the QoE control module. Frozen image detection, which is relevant in case of a video application session, may be based on detecting events associated with buffer fill level estimation, such as empty buffer events, low buffer events, high buffer events and very high buffer events. Each event may be defined by buffer fill threshold values which may be specific for different types of video player applications. As mentioned above latency estimation is also relevant for a video application session. The latency estimation can be made based on estimation of the downloaded volume from the start of the download of video.

For a web application session, the main end-user related property is the latency for download of a web-page. The KPI-estimation can be done according to different alternatives:

1) Estimation of the download rate from the first object on the WEB-page: The KPI-estimation module divides the downloaded volume from the start with the download time. KPI events for detected high throughput and detected low throughput may be reported to the QoE control module.

2) Define specific objects (e.g. an image) in the chain of the download that can be used to check the download performance during the web page download. The idea is that the QoE logic can change the scheduling priority during download such that a satisfactory latency can be achieved. Examples of KPIs may be download time for URL "nn" download in the sequence and associated events for detecting whether the download time for URL "nn" is faster or slower than expected in order to achieve satisfactory QoE.

Figure 5:
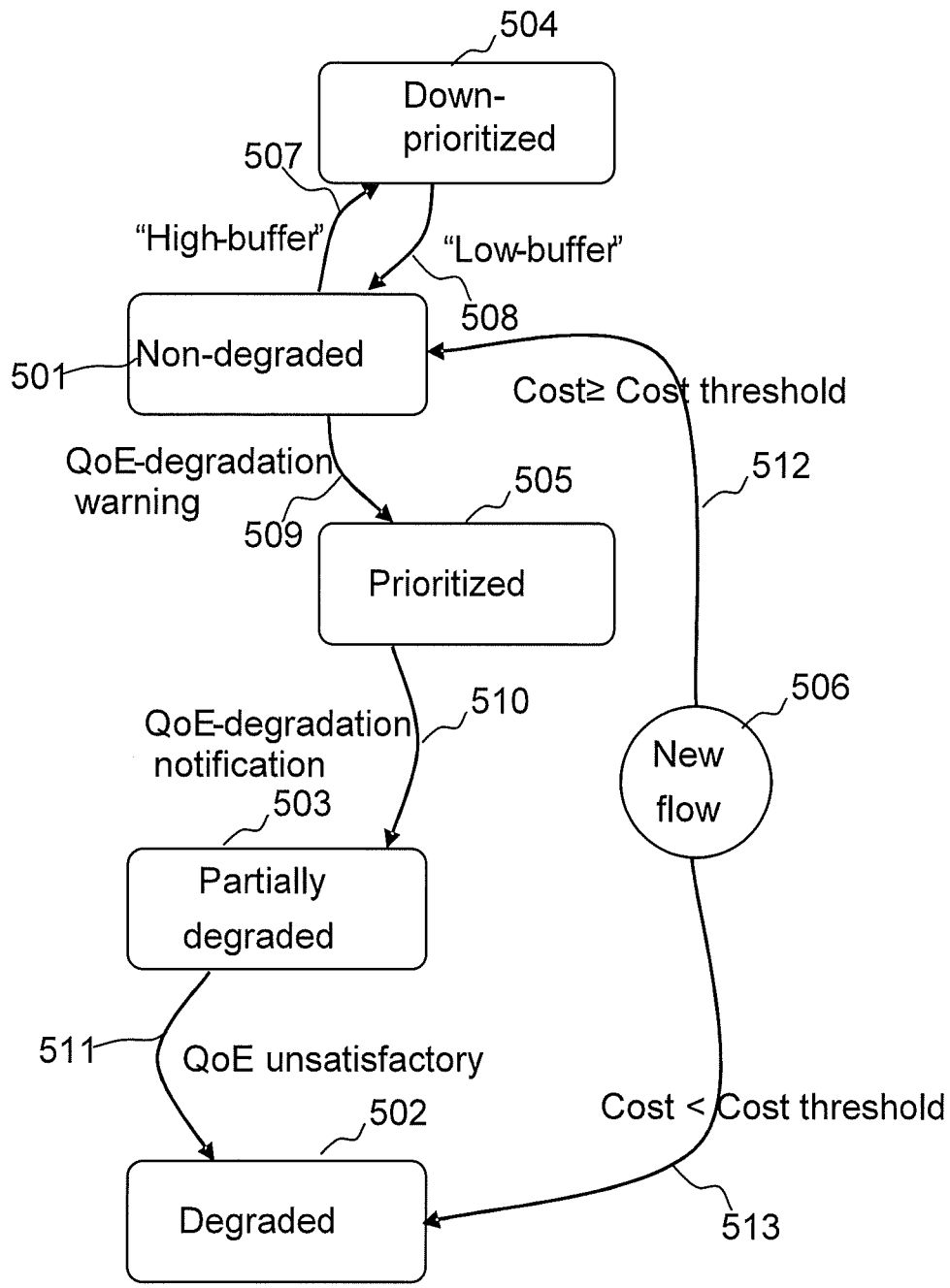
FIG. 5 is a state diagram illustrating an embodiment of a state-machine for QoE-control of application flows.

Examples of QoE-control algorithms which may be used for radio scheduling control will now be described. According to an example QoE control algorithm used for video application sessions, flows are classified in different categories based on their status as determined from estimated KPIs. This is illustrated by the state diagram of FIG. 5. FIG. 5 illustrates a non-degraded state 501, a degraded state 502 and a partially degraded state 504 in which the flows are classified based on measured KPIs as follows:

A flow is classified as non-degraded 501 as long as the QoE-control has not received QoE KPI-degradation notification 510, e.g., in form of a detected low buffer event.

A flow is classified as partially degraded 503 if at least one KPI-degradation event has been received, but the user is not considered to have become unsatisfied yet.

A flow is classified to the degraded state 502, if
   a) several KPI-events has been received or
   b) the rate of events are too high (above a determined limit) or
   c) a severe event has been received and the QoE is considered to be unsatisfactory 511 for the application session associated with the flow.

The QoE-logic may be configured to perform different actions on the flows based on their classification. In FIG. 5 it is illustrated that non-degraded flows may become down-prioritized 504 if the KPI-estimation indicates good performance e.g. a very high buffer event or a high buffer event 507, especially when the radio resource utilization is high and close to congestion. A non-degraded flow may get an increased priority, possibly to a prioritized state 505, if a low buffer event 508 or a QoE warning 509 is received.

A newly detected flow 506 is added into the flow-list. A new TCP-flow can be detected by means of a TCP SYN flag. For each flow in the flow list a cost measure is added to the flow list. The flow list may be sorted based on resource availability in the radio network and the cost measures by classifying newly detected flows as either non-degraded or degraded, as indicated by arrows 512 and 513 in FIG. 5. An indication of scarcity in the air-interface of radio resources is:

1) when there are several on-going flows that can not get satisfactory QoE or
2) output-power in the radio network has reached a maximum limit.

Flows in the degraded state 502 might get further decreased throughput by decreasing the radio scheduling weights/lower the scheduling priority. By down-prioritizing degraded flows radio resources may be freed on the behalf of partially degraded flows. It is better to have 9 flows that can fulfill a QoE-target and one that has a very low throughput than to let 10 flows to be close to but under the QoE-target. Buffer underrun, i.e. empty buffer events, causes frozen images repeatedly and the rate of frozen image is determined by the rate of the empty buffer events.

The "unfair" treatment of down-prioritizing one or several degraded flows may thus contribute to maximizing the QoE over a whole group, rather than have throughput fairness among flows. Especially in case of congestion situations it may be beneficial to further down-prioritize some already degraded flows to provide more available bandwidth to use and thus higher QoE-fulfillment chance for the other flows. Note that the periods of throttling may be counted for in order to re-establish fairness later, i.e., during a forthcoming video session started by the same user. Thus, according to some embodiments aggregated QoE associated with a specific user over a certain period of time may be taken into account when making scheduling decisions.

For the flows that are determined to be prioritized, the QoE-control module may increase the RLC/MAC scheduling priority. The bearer level prioritization should be done in smaller steps upon repetitive feedback of low buffer events. There is no need to increase the transfer rate more than necessary. The increase of scheduling priority would preferably be maintained only as long as is required to maintain satisfactory QoE. If the network conditions improve, which will be shown by increased buffer fill level, the radio scheduling weights could be gradually decreased back to a default value.

Those flows that experience much better QoE than a determined minimum limit, e.g. flows that has very high or high buffer fill level (e.g. expressed by some Mean Opinion Score (MOS) or a large playout buffer) may get down-prioritized status. If the radio resources are highly utilized, the scheduling priority of the respective bearers of the down-prioritized flows may be decreased or the down-prioritized flows may be throttled.

Partially degraded flows may be handled to achieve so-called graceful degradation of a subset of flows in order to optimize the QoE of the whole group of flows. Partially degraded flows are flows for which at least one QoE-degradation KPI-event has been received. That is, partially degraded flows would appear in congestion situations that prohibit the delivery of certain ongoing flows with the required QoE even if the prioritization mechanism is applied. If nothing was done, then these flows would become QoE-degraded over time. In other words the partially degraded flows are flows which are determined to require an increase in radio resources to maintain a satisfactory quality of experience.

The graceful degradation process implies temporal de-prioritization of some of the previously prioritized flows. Graceful degradation may be achieved by making scheduling decisions such that a subset of flows classified in the partially degraded category is alternately down-prioritized and prioritized during different periods of time. The primary goal is to re-establish the QoE for the remaining flows with minimal impact on the overall performance. Below an example is given for graceful degradation for chunk-based video streaming applications. If the network bandwidth is lower then the bandwidth to transfer a chunk of video data during the playout time of a chunk then the user will experience frequent and repetitive frozen images during a video session. The download can however be done in such a way that it minimizes the number of frozen images and decreases the rate of frozen images. The main idea is that if a frozen image happens for a video session, it may be better to let other sessions be able to view the content while this session gets a very small fraction of bandwidth. So, the QoE-control module may be configured to temporarily decrease the scheduling priority for at least some of the partially degraded flows. For some video applications up to 25% interruption of the duration of the session may be allowed. A typical QoE requirement is to have a frozen image at most every 2 minutes. This means, that during a total waiting time of 30 s, several chunks should be downloaded to the playout buffer and together with the potential down-prioritization of the other flows this will guarantee a glitch-free playout during the next 2 minutes. If degradation or partial degradation happens, the QoE-control logic may also send notification to e.g., a management system or the playout buffer to inform about potential service degradation due to shortage of resources.

To exemplify an advantage of using the example QoE-algorithm described above, bandwidth gain estimates for video will now be discussed. If we assume that 25% interruption of the duration of the video session is allowed, some long interruptions (with very low allocated capacity) may be enforced during the video session if the network conditions require this. The playout can be similar to the interruptions on the broadcast televisions filled with advertisements. So from a QoE-perspective it will not be worse than TV but, it can generate a gain of 25% of the bandwidth. Handling of the degraded flows means that the scheduling of resources is made unfair such that some of the end-users get good QoE, but other gets significantly lower QoE. For example, if a QoE-requirement is that 90% of end-users should be satisfied and assuming equal bandwidth demand between the users, shaping 10% of them results in an additional 10% bandwidth for the remaining users. In addition, considering 25% extension possibility of the sessions, this results in altogether $0.9*(1-0.25)=0.625$ times lower capacity, i.e., 1.6 times capacity gain.

Note that flow prioritization and down-prioritization yields in addition a significant capacity gain compared to fair-share scheduler settings and lack of admission control. This is hard to estimate numerically, but one can relate it to the over-provisioning concept in the core networks, where an over-provisioning factor of 2 is generally used in order to count for traffic fluctuations. Since the core networks represent a much higher aggregation level, in case of mobile access this factor should probably be much higher than 2, which may be spared if using scheduling control intelligently.

If the radio network has a traffic mix of web, video and peer-to-peer traffic, the peer-to-peer traffic can be throttled such that the web and video traffic gets more bandwidth. For the DPI-implementation, the DPI easily identifies the peer-to-peer traffic and easily can perform shaping such that other types of traffic, which is considered more important traffic, can use more radio network resources instead.

Most of the example embodiments presented above have described operation with video sessions in mind. However, the same strategy can be used for web-traffic where the priority is dynamically changed during a web-page download. As mentioned above, there are two example approaches for web-traffic that may be used: download time for specific URL-objects or KPIs measuring the throughput.

In case the download time for specific URLs is used as KPIs, the priority of a flow may be modified as follows:

If the download time of URL=nn is shorter than expected, decrease scheduling priority of the associated flow.

If the download time of URL=nn is longer than expected, increase scheduling priority of the associated flow.

In case KPIs measuring the throughput are used, the priority of a flow may be modified as follows:

If the throughput is lower than expected, increase the scheduling priority of the associated flow.

If the throughput is higher than expected, decrease scheduling priority of the associated flow.

When referring to download/throughput being lower or higher than expected above, it is assumed that the expected reference values have been derived from what could be expected if a satisfactory QoE is to be maintained for the application session associated with the flow.

It can be understood from the above described example QoE algorithm that there are many variants of QoE algorithms that could be used, which may implement some or all of the features described above. As mentioned above, the optimization of the QoE of the application sessions associated with the plurality of flows of application data may be subject to certain conditions, such as fairness conditions. An example of a fairness condition that may be applied is that users that have had very high radio resource utilization historically may be restricted from using more radio resources than a certain threshold level. This may be used to prevent a few high-usage users from continuously occupying large amounts of radio resources to the detriment of other users.

Figure 6:
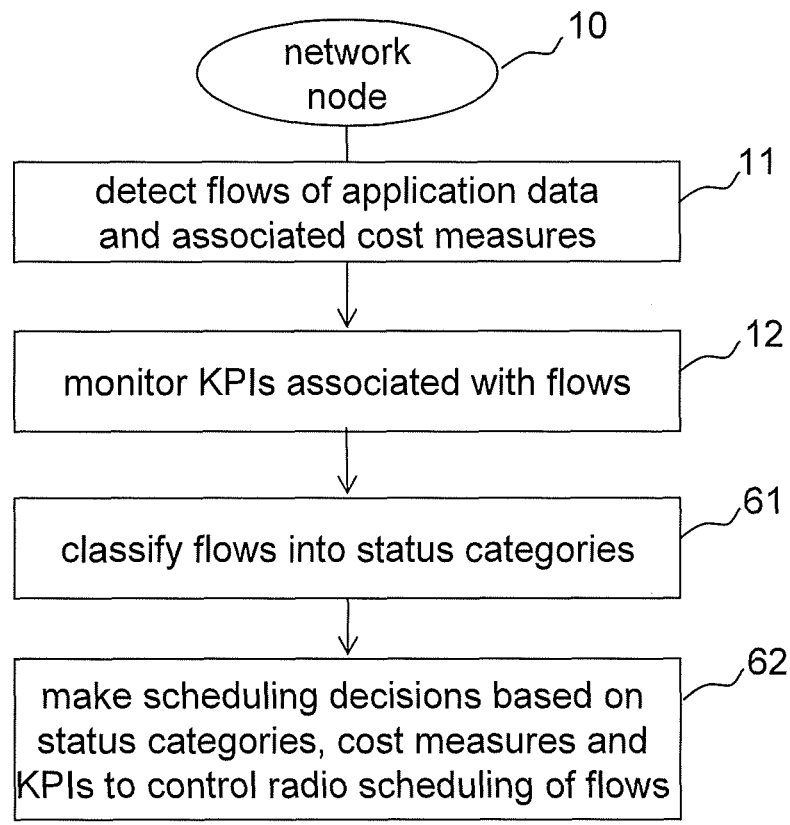
FIG. 6 is a flow diagram illustrating an alternative embodiment of method for controlling a plurality of flows of application data in a radio network.

FIG. 6 is a flow diagram illustrating an embodiment of a method for controlling a plurality of flows of application data in a radio network. The method in FIG. 6 is a variant of the method illustrated in FIG. 1, where scheduling decisions are based on flow status. The method comprises a step 11 of detecting the plurality of flows of application data and associated cost measures, which corresponds to the step 11 of FIG. 1. The method further comprises a step 12 of monitoring key performance indicators (KPIs) associated with the plurality of flows. The step 12 also corresponds to the step 12 of FIG. 1. In a step 61, the plurality of flows is classified into status categories e.g. as described above in degraded, non-degraded and degraded categories, and perhaps further also in prioritized and down-prioritized categories. The method illustrated in FIG. 6 comprises a further step 62 of making scheduling decisions. The step 62 is similar to the step 13 of FIG. 1. However, in the step 62 the scheduling decisions are made based on the status categories of the flows respectively as well as based on the cost measures and key performance indicators associated with the plurality of flows.

Figure 7:
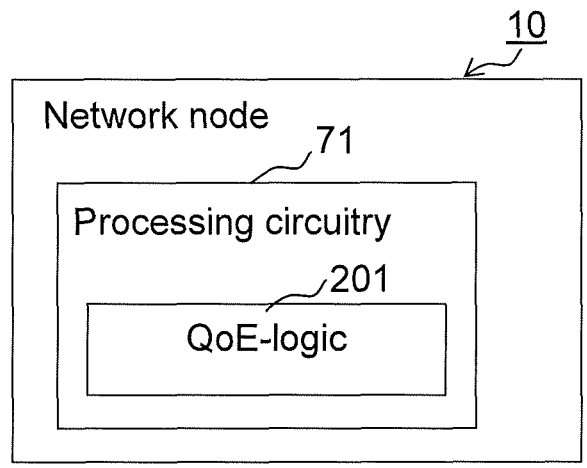
FIG. 7 is a schematic block diagram of network node according to an example embodiment.

FIG. 7 is a schematic block diagram of an example embodiment of a network node 10, in which the QoE logic 201 may be implemented. Thus the network node may be configured to also implement the example methods illustrated in FIGS. 1 and 6. As shown in FIG. 7, the example network node 10 includes processing circuitry 71, which comprises the QoE-logic. The network node 10 may e.g. be a base station or a radio network controller. The network node 10 would also generally comprise e.g. memory circuitry, interface circuitry for communication with other nodes, and depending on the type of network node in some cases also transceiver circuitry and antenna circuitry. However in FIG. 7 only such components which are of particular relevance for the embodiments of this disclosure are illustrated in FIG. 7. Alternative embodiments of the network node 10 may thus include additional components beyond those shown in FIG. 7 that may be responsible for providing certain aspects of the network node's functionality, including any of the functionality described above and/or any functionality necessary to support the embodiments described above. In particular embodiments, some or all of the functionality described above as being provided by the QoE-logic, may be provided by the processing circuitry 71 executing instructions stored on a computer-readable medium, such as a memory embodying the QoE-logic 201. Thus the processing circuitry 71 may be configured to execute instructions of different software modules, such as a software module comprising program instructions for implementing one of the example QoE algorithms described above.

Different embodiments of this disclosure are applicable for controlling both downlink and uplink radio scheduling, although it can be envisaged that the most common usage scenario may be to control downlink scheduling.

In the drawings and specification, there have been disclosed typical embodiments and, although specific terms are employed, they are used in a generic and descriptive sense only and not for purposes of limitation, the scope of the invention being set forth in the following claims.

The invention claimed is:

1. A method for use in a network node for controlling a plurality of flows of application data in a radio network, the method comprising:
    detecting the plurality of flows and a cost measure associated with each flow, wherein the cost measure is an indication of an amount of radio resources required for supplying an amount of application data to an end-user of the flow;
    monitoring key performance indicators associated with the plurality of flows, wherein a key performance indicator of each flow is indicative of a supply of application data needed to maintain a predefined quality of experience for an application session associated with the flow, and wherein each key performance indicator is monitored based on type of the application session associated with each flow, and
    making scheduling decisions based on the cost measures and the key performance indicators associated with the plurality of flows, to control radio scheduling of the plurality of flows in order to achieve optimization of a quality of experience of the application sessions associated with each of the plurality of flows.

2. The method according to claim 1, wherein said optimization involves maximizing a number of the application sessions for which the predefined quality of experience is maintained.

3. The method according to claim 1, further comprising determining which of the plurality of flows that are to be prioritized in scheduling of the radio resources and which of the plurality of flows that are to be down-prioritized in the scheduling of the radio resources for said optimization.

4. The method according to claim 1, further comprising classifying the plurality of flows into status categories, wherein said status categories comprise:
    a degraded category for flows which are determined, based on the monitored key performance indicators, to be associated with application sessions for which the current quality of experience is unsatisfactory; and
    a non-degraded category for flows which are determined, based on the monitored key performance indicators, to be associated with application sessions for which the current quality of experience is satisfactory; and
    wherein a scheduling decision for each flow depends on the status category of the flow.

5. The method according to claim 4, wherein the status categories further comprises a partially degraded category for flows which are determined, based on the cost measures and the monitored key performance indicators, to require an increase in radio resources to maintain a satisfactory quality of experience for application sessions associated with such flows.

6. The method according to claim 5, wherein said scheduling decisions are made such that a subset of flows classified in the partially degraded category is alternately down-prioritized and prioritized during different periods of time.

7. The method according to claim 1, wherein said scheduling decisions comprise at least one of:
    a decision to shape a given flow prior to said scheduling of the plurality of flows by a radio scheduler; and
    a decision to modify a scheduling priority applied by the radio scheduler for said scheduling of the given flow.

8. The method according to claim 1, wherein said cost measures of the plurality of flows are obtained from channel quality indicators (CQIs) determined for radio channels associated with the plurality of flows, and wherein the CQIs are indicative of transmission power required for the supply of the application data.

9. The method according to claim 1, wherein the plurality of flows comprises flows of video traffic to be played by a video player application for the predefined quality of experience.

10. The method according to claim 9, wherein said monitored key performance indicators for a given one of the flows of video traffic is an indication of a fill level of a play-out buffer of a video player application session with which the given flow of video traffic is associated.

11. The method according to claim 1, wherein the plurality of flows comprises flows of web traffic for displaying of a web-page by a web browser application for the predefined quality of experience.

12. The method according to claim 11, wherein said monitored key performance indicators for a given one of the flows of web traffic is an indication of a download rate of the given flow of web traffic.

13. A network node for controlling a plurality of flows of application data in a radio network, the network node comprising processing circuitry configured to:
    detect the plurality of flows and a cost measure associated with each flow, wherein the cost measure is an indication of an amount of radio resources required for supplying an amount of application data to an end-user of the flow;
    monitor key performance indicators associated with the plurality of flows, wherein a key performance indicator of a flow is indicative of a supply of application data needed to maintain a predefined quality of experience for an application session associated with the flow, and wherein each key performance indicator is monitored based on type of the application session associated with each flow, and
    make scheduling decisions based on the cost measures and the key performance indicators associated with the plurality of flows, to control radio scheduling of the plurality of flows in order to optimize a quality of experience of the application sessions associated with each of the plurality of flows.

14. The network node according to claim 13, wherein the processing circuitry is configured to optimize the quality of experience by maximizing a number of the application sessions for which the predefined quality of experience is maintained.

15. The network node according to claim 13, wherein the processing circuitry is further configured to determine which of the plurality of flows that are to be prioritized in scheduling of the radio resources and which of the plurality of flows that are to be down-prioritized in the scheduling of the radio resources for said optimization.

16. The network node according to claim 13, wherein the processing circuitry is further configured to classify the plurality of flows into status categories, wherein said status categories comprise:

a degraded category for flows which are determined, based on the monitored key performance indicators, to be associated with application sessions for which the current quality of experience is unsatisfactory; and a non-degraded category for flows which are determined, based on the monitored key performance indicators, to be associated with application sessions for which the current quality of experience is satisfactory; and wherein the processing circuitry is configured to make the scheduling decisions such that the scheduling decision for each flow depends on the status category of the flow.

17. The network node according to claim 16, wherein the status categories further comprise a partially degraded category for flows which are determined, based on the cost measures and the monitored key performance indicators, to require an increase in radio resources to maintain a satisfactory quality of experience for the application sessions associated with such flows.

18. The network node according to claim 17, wherein the processing circuitry is configured to make said scheduling decisions such that a subset of flows classified in the partially degraded category is alternately down-prioritized and prioritized during different periods of time.

19. The network node according to claim 13, wherein the scheduling decisions, which the processing circuitry is configured to make, comprises at least one of:
    a decision to shape a given flow prior to said scheduling of the plurality of flows by a radio scheduler; and
    a decision to modify a scheduling priority applied by the radio scheduler for said scheduling of the given flow.

20. The network node according to claim 13, wherein the processing circuitry is configured to obtain said cost measures of the plurality of flows from channel quality indicators (CQIs) determined for radio channels associated with the plurality of flows, and wherein the CQIs are indicative of transmission power required for the supply of the application data.

21. The network node according to claim 13, wherein the plurality of flows comprises flows of video traffic to be played by a video player application for the predefined quality of experience.

22. The network node according to claim 21, wherein said key performance indicators for a given one of the flows of video traffic is an indication of a fill level of a play-out buffer of a video player application session with which the given flow of video traffic is associated.

23. The network node according to claim 13, wherein the plurality of flows comprises flows of web traffic for displaying of a web-page by a web browser application for the predefined quality of experience.

24. The network node according to claim 23, wherein said key performance indicators for a given one of the flows of web traffic is an indication of a download rate of the given flow of web traffic.

* * * * *